Jan. 13, 1970   JEAN-PAUL FILIPPI ET AL   3,489,180
PROCESS FOR THE INSTALLATION OF A TIME-LAG DEVICE WITH PNEUMATIC
LOGICAL RELAYS AND A DEVICE FOR ITS OPERATION
Filed June 19, 1967
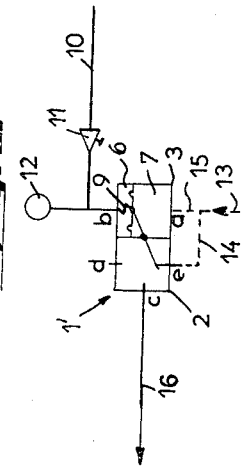
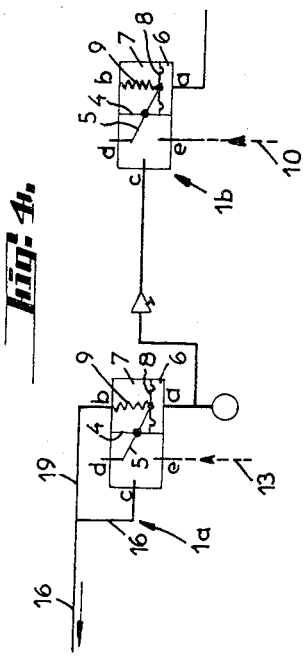
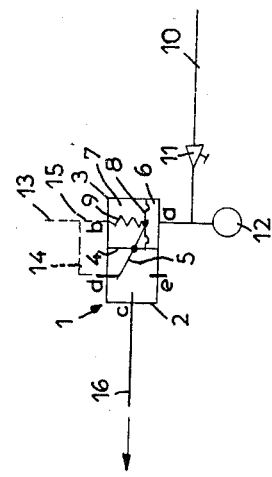
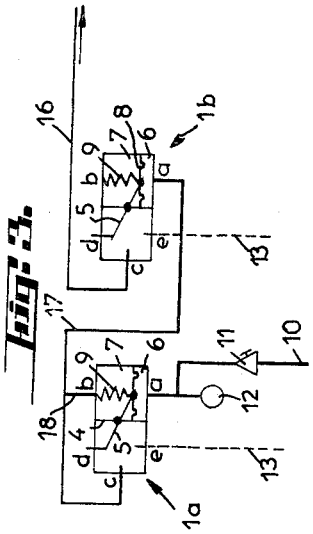
INVENTORS
JEAN-PAUL FILIPPI
MARC EDOUARD ZUCCA
BY
Kenyon & Kenyon
ATTORNEYS

United States Patent Office 3,489,180
Patented Jan. 13, 1970

3,489,180
PROCESS FOR THE INSTALLATION OF A TIME-LAG DEVICE WITH PNEUMATIC LOGICAL RELAYS AND A DEVICE FOR ITS OPERATION
Jean-Paul Filippi and Marc Edouard Zucca, La Ciotat, France, assignors of one-third to Chantiers Navals de La Ciotat, La Ciotat, Bouches-du-Rhone, France, a company of France
Filed June 19, 1967, Ser. No. 647,172
Claims priority, application France, June 21, 1966, 66,309
Int. Cl. F16k 11/00, 7/17; F15c 3/04
U.S. Cl. 137—625.66     3 Claims

ABSTRACT OF THE DISCLOSURE

A rated value pressure is applied upon one face of the diaphragm of the relay as soon as the exciting pressure exerted upon the other face of said diaphragm sets the shifting element in motion, this rated value being different from the value of the pressure of the excitation circuit which causes said shifting element to move, in whatever direction the pressure of said excitation should variate to control the operation of said relay.

---

The present invention has essentially for its object a process for the installation of a time-lag device with pneumatic logical relays, comprising each of three-channels valve provided with two ports alternately closable by a shifting element, one at least of these ports being connectable with a circuit of fluid under pressure, for instance a fluid supply circuit, and with an outlet orifice connectable with a fluid circuit, for example with a load circuit, an excitation chamber provided with an aperture connected with an exciter circuit including a constriction and a capacity, and a second chamber also provided with an aperture and separated from said excitation chamber by a diaphragm controlling the position of said shifting element in such way that, according to the differential pressure exerted upon said diaphragm, the shifting element obturates either one or the other of said closable ports, and consequently makes or breaks the connection between the aforementioned supply and load circuits.

It is known that, up to now, the industrial utilizations of the pneumatic logical relays remained fairly restricted, due to the difficulties met to obtain purely pneumatic time-delayings in the sequential circuit arrangements using such relays.

Time-delaying consists in introducing a certain time interval between the moment the change of state signal is emitted to the relay, for instance by the exciter circuit, and the moment when the relay actually changes its state.

It is known, for the time being, to achieve a time-lag by introducing a constriction, for example a one-way constriction, at a point of the exciter fluid channel connected with the excitation chamber, and by eventually increasing the cubic contents of this channel, by associating a capacity to it. The narrower the constriction and the higher the capacity are, the slower the pressure establishes in the excitation chamber. When the pressure in the exictation chamber exerts upon the diaphragm a force equal to the back-pressure to which this diaphragm is subjected, this reaction being generally due, at least for a part of it, to a spring housed within said second chamber contiguous with the excitation chamber, the relay changes its state.

However, the actual operation of such a time-lag relay avers to be substantially different from the just described ideal principle of action. Indeed, the spring acting upon the diaphragm presents a slope characteristic different from zero, and the stress to overcome depends on the displacement amplitude of the shifting element; besides, the volume of the chamber commutating the three-channels valve varies also along with the displacement stage of said shifting element. For both of these reasons, the relay cannot achieve a quick change of state, its state changing period being moreover as much longer, as the associated constriction is narrower.

This non-instantaneousness in the change of state of the relay impedes practically the achievement of a timing.

The process according to the invention aims at overcoming these drawbacks, and is characterized in that it consists in applying, as soon as the exciting pressure exerted upon one face of the diaphragm sets the shifting element in motion, a rated value pressure upon the other face of said diaphragm, this rated value being different from the value of the exciting pressure which causes the shifting element to move, in whatever direction said exciting pressure should variate to control the operation of said time-lag device.

Thus, the process according to the invention allows to obtain, either the disappearance or the decreases of the reaction opposed to the exciting pressure, or, on the contrary, the increase or the sudden appearance of a reaction opposed to said exciting pressure.

According to another feature inherent to the process of the invention, and in the case where the device is controlled by an increasing exciting pressure, a sudden low pressure will be created within said second chamber.

According to still another feature of the invention, said second chamber is connected with the atmosphere during the change of position of said shifting element.

According to the invention, this connection with the atmosphere is achieved through the valve.

In the case of a device controlled by a decreasing exciting pressure, a sudden overpressure will be created within said second chamber.

Still according to the invention, the pressure of the load circuit is employed to create this overpressure.

The invention has also for another of its objects a device for the performance of the aforementioned process, remarkable notably in that it comprises a relay connected with an exciter circuit, under a pressure $P_1$ and fed by a supply circuit which is under a pressure $P_2$ such that $P_2 < P_1$, connected with one of said closable ports and supplying a third circuit, for example the load circuit, said second chamber of the relay communicating, through a duct or the like, either with that of the two closable valve gaps which is linked to the supply circuit, or with the load gap, while the second closable port is connected with a pressure lower than $P_2$.

The invention covers also, as new industrial products, the arrangements equipped with devices of the aforementioned type.

Many other features of the invention will become apparent from the following description and from the appended drawings, given only by way of examples, and wherein:

FIGURE 1 is a diagrammatical illustration of a time-lag device according to the invention, said device using a single relay;

FIGURE 2 shows a first alternative embodiment of a device in accordance with the invention and using also a single relay;

FIGURE 3 shows a second alternative embodiment of the device in accordance with the invention, using two relays;

FIGURE 4 shows a third alternative embodiment of the device in accordance with the invention, using also two relays.

According to the method of embodiment represented on FIGURE 1, a time-lag device in conformity with the invention comprises a pneumatic logical relay, indicated as a whole by 1 and composed of two distinct casings 2 and 3, forming respectively a three-channels valve and the control unit of this three-channels valve, these two casings being separated by a fluid-tight partition 4, onto which a tiltable blade 5 is hingedly adapted.

The casing 3 is itself divided in two distinct chambers: a first chamber 6, called excitation chamber, and a second chamber 7. The two chambers 6 and 7 are separated by a resilient diaphragm 8. A spring 9, housed within chamber 7, keeps normally the blade 5 in the position represented on FIGURE 1.

The chambers 6 and 7 are provided with apertures, respectively $a$ and $b$, while the casing 2 forming the three-channels valve is provided with a first orifice $c$, called load orifice, and with two ports, $d$ and $e$, co-operating with the blade 5 and capable of being alternately closed by said blade, depending on the position of the latter.

The excitation chamber aperture $a$ is supplied by an exciting fluid, which is under a pressure $P_1$, and for instance constituted by compressed air, said fluid being led in from a not represented source through a supply channel 10 including a constriction 11 and a capacity 12.

The aperture $b$ of the second chamber 7, as well as the port $d$ of the casing 2 are connected, by means of the tubes 14 and 15, to the channel 13 of the fluid supply circuit, the pressure $P_2$ of which is such that $P_2<P_1$. The orifice $c$ is connected to the load circuit channel 16 of the arrangement. The port $e$ communicates with the atmosphere and is used for the effluence.

The principle of action of the relay is the following: at the moment the exciter pressure $P_2$ develops within the chamber 6 a force balancing that of the spring 9, the blade 5 starts tilting. As soon as the tilting has started, the blade 5 frees the port $d$, which is hence directly connected with, on the one hand, the load orifice $c$, and on the other hand, the effluence orifice $e$. A sudden pressure decrease results within the second chamber 7, the aperture $b$ of which is connected with the port $d$ by means of conduits 14 and 15. This pressure decrease results, on the one hand, from the supply-fluid leakage through $e$ and, on the other hand, from the outflow toward the load. Of course, this leakage through $e$ lasts until the blade 5 achieves its tilting motion and obturates the port $e$. The pressure at $c$ reaches practically very quickly 80% of the supply pressure $P_2$, and this pressure is sufficient to secure an absolute operation of the appliances controlled by the relay.

The port $e$ may be connected with a medium under a pressure lower than $P_2$.

It is also possible to suppress the spring 9: in this case, the blade 5 tilts practically instantaneously and the pressure in $c$ reaches at once the value $P_2$.

The operation described hereabove may be considered as binary, and a time lag of this type integrates perfectly within any logical sequence.

The FIGURE 2 represents a first alternative embodiment of the device according to the invention, using a relay 1', which is different from the relay 1 of FIGURE 1 in that the spring 9 is set up in the excitation chamber 6, so that it exerts upon the diaphragm 8 a pressure added to the exciting pressure, instead of being counter-acting to it, as the case was in the relay of FIGURE 1. In spite of this reverted action of the spring 9, the designation of the apertures $a$ and $b$ does not change when compared with the indications of FIGURE 1, as required by the usual convention in logical relay matters. In the present case, the exciter pressure is set-in in $b$, the supply fluid is introduced through $a$ and $e$ and the port connected with the atmosphere is $d$.

It will be readily seen that, when the blade 5 starts tilting, the second chamber 7, opposed to chamber 6, communicates through the connecting tubes 14 and 15 with the casing 2, i.e. on the one hand with the atmosphere through the port $d$, and on the other hand with the load circuit through the orifice $c$.

The methods of embodiment illustrated on FIGURES 3 and 4 utilize relays similar to that of FIGURE 1, so that the reference numbers designating the different component parts of these relays as well as the circuits associated with them have not been repeated, except for the orifices $a$, $b$, $c$, $d$ and $e$.

FIGURE 3 illustrates a second method of embodiment, utilizing two relays 1a and 1b. The excitation 10 is led to the aoperature $a$ of the first relay 1a, the supply 13 is introduced through the ports $e$ of both relays, the output orifice $c$ of the first relay is connected, by channel 17, with the exciting orifice $a$ of the second relay, and by the channel 18 to the aperture $b$ of its second chamber 7, while the load circuit is connected to the orifice $c$ of the second relay.

The port $d$ of the first relay 1a may be connected with a source delivering a pressure having a value lower than that of the supply pressure $P_2$, or again may open into the atmosphere, as represented. The port $d$ of the second relay 1b is connected with the atmosphere.

The first relay 1a operates exactly as the relay of FIGURE 1: its second chamber 7 communicates with the atmosphere through the channels 17 and 18 as soon as the blade 5 has tilted away from its represented position unto its other position.

The use of the second relay, which plays the role of an inverter, is only necessary if a pressure appearance instead of a pressure disappearance is wanted at the end of the time-delaying.

A third alternative embodiment of the invention is represented on FIGURE 4, which relates also to a two relays time-lag device and corresponds to the use of a decreasing exciter pressure and of an increasing or a suddenly appearing back pressure. The aperture $b$ of the second chamber 7 within the first relay 1a is connected by a channel 19 to the load circuit 16, itself connected to the outlet $c$ of the first relay. The supply circuit, under a pressure $P_2$, is connected to the port $e$ of the three-channels valve housed within the first relay. The excitation chamber of the first relay is supplied by an exciter circuit controlled by the second relay 1b.

It should be noted that the use of the second inverter relay is only necessary if the excitation is achieved by pressure emission instead of pressure disappearance. In order to set up a time-lag device according to the invention, relays of known types may be employed. It is also possible to use, for the exciter and the supply pressures, any values, as long as the value $P_2$ of the supply pressure is lower than the value $P_1$ of the exciter pressure, the margin between these two pressures being sufficient to overcome the stress developed by the spring 9 acting upon the diaphragm 8. It has been experimentally established that good results could be obtained by using for the pressures $P_1$ and $P_2$, respective values of 1, 4 bars and 0, 8 bar.

The time-lag devices according to the invention allow to achieve any serial automation using pneumatic relays. Such pneumatic relays may advantageously replace electrical relays, especially when installations liable to operate in explosive or inflammable atmospheres should be equipped, such as for instance in the chemical industries, in the petroleum industries, in pyrotechnics, etc. Another advantage presented by the pneumatic relays over the electrical relays is their practically constant characteristics over long time-ranges. Finally, the pneumatic relays require practically no maintenance and the failures are easy to detect.

Of course, the invention is by no ways limited to the methods of embodiment described and represented, which have only been given by way of examples.

What we claim is:

1. A time-lag device for a pneumatic logical circuit comprising a constriction and a capacity receiving an exciting pressure and delivering said exciting pressure after a certain time interval, a pneumatic logical relay comprising a first casing having a first port, a second port and an outlet orifice, said first casing being subjected to a fluid supply pressure lower than said exciting pressure from said first port and to an external medium pressure lower than said fluid supply pressure from said second port, a shifting element in said first casing movable to obturating positions with either one or the other of said ports at a time leaving both ports open during its movement, a second casing separated from said first casing and having an excitation chamber with an excitation aperture and a second chamber with an aperture, a diaphragm member separating said chambers and adapted for moving said shifting element into its respective obturating positions, said excitation chamber receiving said exciting pressure from said constriction and said capacity through said excitation aperture, and duct means for connecting the aperture of said second chamber to said first port whereby said last-named aperture communicates with both said second port and said outlet orifice only during the changes of obturating positions of said shifting element as effected by said diaphragm member.

2. A time-lag device according to claim 1 wherein said second port communicates with the atmosphere.

3. A time-lag device according to claim 1 wherein a spring is housed within said second chamber for exerting upon said diaphragm member a pressure opposite to that of said exciting pressure.

References Cited

UNITED STATES PATENTS

| | | | |
|---|---|---|---|
| 2,772,688 | 12/1956 | Brock | 137—624.14 X |
| 3,160,486 | 12/1964 | Busch | 137—624.14 X |
| 3,252,471 | 5/1966 | Olson | 137—270 X |
| 3,291,153 | 12/1966 | Chabrier | 137—624.14 |
| 3,353,559 | 11/1967 | Phillips | 137—625.66 |
| 3,385,322 | 5/1968 | Brandenberg | 137—625.66 |

ALAN COHAN, Primary Examiner

U.S. Cl. X.R.

137—625.6